(12) United States Patent
Currle et al.

(10) Patent No.: US 6,896,047 B2
(45) Date of Patent: May 24, 2005

(54) HEATING AND/OR AIR CONDITIONING SYSTEM HAVING A DECENTRALIZED AIR-CONVEYING DEVICE

(75) Inventors: Joachim Currle, Stuttgart (DE); Frank Fruehauf, Aichwald (DE); Juergen Maue, Weilheim/Teck (DE); Juergen Wertenbach, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 208 days.

(21) Appl. No.: 10/301,873

(22) Filed: Nov. 22, 2002

(65) Prior Publication Data

US 2003/0115887 A1 Jun. 26, 2003

(30) Foreign Application Priority Data

Nov. 23, 2001 (DE) .......................................... 101 57 498

(51) Int. Cl.[7] .................................................. B60H 1/00
(52) U.S. Cl. ......................... 165/204; 62/244; 165/203
(58) Field of Search ............................ 165/41, 42, 43, 165/203; 62/261, 244, 3.3, 3.5; 454/120, 907

(56) References Cited

U.S. PATENT DOCUMENTS

| 4,873,837 A | * 10/1989 | Murray .......................... 62/244 |
| 4,949,779 A | * 8/1990 | Kenny et al. ................... 165/42 |
| 5,001,905 A | 3/1991 | Miyazaki |
| 5,054,378 A | 10/1991 | Speece |
| 5,388,958 A | 2/1995 | Dinh |
| 5,450,894 A | * 9/1995 | Inoue et al. ................... 165/43 |
| 5,715,997 A | * 2/1998 | Ito et al. ......................... 165/43 |
| 6,318,109 B1 | * 11/2001 | Reimann et al. .............. 62/244 |
| 6,598,665 B2 | * 7/2003 | Schwarz ....................... 165/42 |

FOREIGN PATENT DOCUMENTS

| DE | 1 879 831 | 9/1963 |
| DE | 3738425 A1 | 5/1989 |
| DE | 19625927 A1 | 1/1998 |
| DE | 19814581 A1 | 10/1999 |
| DE | 19923189 C1 | 11/2000 |
| DE | 19947567 A1 | 4/2001 |
| EP | 0816143 A2 | 1/1998 |
| EP | 1088696 A2 | 4/2001 |
| FR | 2683188 A1 | 5/1993 |
| JP | 61263822 A | 11/1986 |
| JP | 11-5441 | 1/1999 |

OTHER PUBLICATIONS

European Search Report mailed Apr. 2, 2004.

* cited by examiner

Primary Examiner—Teresa J. Walberg
(74) Attorney, Agent, or Firm—Crowell & Moring LLP

(57) ABSTRACT

A heating and/or air conditioning system for an interior of a vehicle has a central heating and/or cooling device and a decentralized air-conveying device which includes a plurality of air-conveying units arranged locally in the vehicle interior. In order to permit good regulation of the heating and/or air conditioning system and efficient air conditioning, respective air-conveying units of the decentralized air-conveying device are arranged in a plurality of subspaces of the vehicle interior for circulating air in the respective subspaces.

17 Claims, 3 Drawing Sheets

HEATING AND/OR AIR CONDITIONING SYSTEM HAVING A DECENTRALIZED AIR-CONVEYING DEVICE

This application claims the priority of German application 101 57 498.3, filed Nov. 23, 2001, the disclosure of which is expressly incorporated by reference herein. Reference is also made to co-pending U.S. patent applications 10/301,812, filed Nov. 22, 2002, titled HEATING AND/OR AIR-CONDITIONING SYSTEM WITH VENTILATION AND EVACUATION, and 10/301,824, filed Nov. 22, 2002, titled HEATING AND/OR AIR-CONDITIONING SYSTEM.

BACKGROUND AND SUMMARY OF THE INVENTION

The present invention relates to a heating and/or air conditioning system for a plurality of subspaces in an interior of a vehicle, including at least one of a driver's footwell, a front passenger's footwell, and a rear footwell, with a central air-conveying and/or air-conditioning device which is designed for at least one of heating, cooling, drying, cleaning, humidifying, and conveying air, having at least one fan, a heat exchanger and an evaporator, and which can be switched between a plurality of operating modes, and a decentralized air-conveying device which has a plurality of air-conveying units arranged in the vehicle interior.

German publication DE 198 14 581 A1 discloses an air conditioning system having a central refrigerant module arranged in an engine compartment. In addition to the central refrigerant module, a plurality of decentralized heat transfer units are distributed in the vehicle interior. Air is supplied to the heat transfer units via air ducts, a central fan in each case supplying one or more heat transfer units. The fan is arranged centrally either in the region of the A-pillar or in the region of the C-pillar. The heat transfer units are connected to a common heating circuit. A disadvantage here is that a piping arrangement which is structurally complicated and also energetically unfavorable, because it is loss-afflicted, is required in order to connect the decentralized units.

German publication DE 196 25 927 A1 shows a device for heating or cooling a vehicle, in particular a bus. The device has a central heat exchanger and, in addition, a plurality of heat exchangers which are distributed in the interior of the bus and in each case heats up or cools some sections of the interior. The heat exchangers are connected to one another via a common heating circuit and are charged with air by a central fan via air ducts.

The disadvantages here are the piping arrangement, which is likewise structurally very complicated, and the relatively indefinite possibility of setting the temperature since it concerns a very large section of the interior.

One object of this invention is to provide a heating and/or air conditioning system for a vehicle interior which is constructed in a structurally simple manner and can preferably be readily regulated. In particular, the heating and/or air conditioning system is to have a low energy consumption and permit efficient air conditioning.

This object is achieved according to the invention by a heating and/or air conditioning system in which respective air-conveying units of a decentralized air-conveying device are arranged in a plurality of subspaces in the vehicle interior. In at least one operating mode, the central air-conveying and/or conditioning device feeds ingoing air into the vehicle interior and removes outgoing air, and the air-conveying units of the decentralized air-conveying device circulate air in respective subspaces.

The interior of a vehicle, for example a passenger vehicle or bus, is, as a rule, constructed with a lot of cavities and has a plurality of internal components, for example seats or partitions, which divide the interior into a plurality of subspaces. Subspaces of this type may, for example, be a driver's footwell and/or a front passenger's footwell and/or a rear footwell on the right-hand side or left-hand side or the space behind a seat back in buses. The invention envisages arranging a respective air-conveying unit of a decentralized air-conveying device in a plurality of these subspaces for circulating circulating air. In addition, a central air-conveying and/or air-conditioning device is provided which can be arranged, for example, at a central point in the engine compartment or in the cockpit region. This device charges the vehicle interior with conditioned ingoing air, in particular fresh air or outside air, and/or removes used outgoing air. The central air-conditioning and/or air-conveying device may comprise a fan and/or a heat exchanger and/or an evaporator and/or a filter for preparing and/or conveying the air.

The decentralized air-conveying device is designed in such a manner that the circulation of the circulating air and/or of the outside air takes place within one or more subregions of the vehicle interior. A loss-afflicted guidance of the circulating air via long air ducts with high flow resistance is therefore avoided. Air ducts can therefore be omitted, and the heating and/or air conditioning system can be designed very compactly.

The decentralized air-conveying device circulates the circulating air and/or the outside air within the associated subregions of the interior, the individual subflows of the subregions being largely separated from one another. An undesired mixing of air can therefore largely be avoided.

Provision is made, in particular, for each of the decentralized air-conveying units to have an air inlet opening and an air outlet opening for feeding in and removing circulating air. Air inlet opening refers to the opening through which air flows into the interior of the vehicle, and air outlet opening refers to the opening through which air is removed from the interior. The air inlet opening of a decentralized air-conveying unit is connected to the air outlet opening of the same air-conveying unit via a short, locally delimited and closed air duct, the air-conveying unit being arranged in the air duct between the air inlet opening and the air outlet opening. In order to obtain a guide for the air which is as short as possible and is therefore of low resistance, the air inlet opening and the air outlet opening of an air-conveying unit can be arranged spatially adjacent, in particular situated next to one another, in a subspace.

One design envisages installing the air-conveying unit in a seat, in particular in the backrest or seat cushion of a seat, the air inlet opening and the air outlet opening facing the footwell, which is situated behind the seat, so that the footwell can be ventilated. In addition, some of the air can be used for ventilating, in particular for heating and/or cooling, the backrest and/or the seat surface of the seat by guiding some of the air along the surface of the seat cushion or along the surface of the backrest.

A further design envisages the air-conveying unit being arranged in the region of the dashboard, in the driver's or front passenger's footwell, so that the air inlet opening and the air outlet opening in each case face the driver's footwell or the front passenger's footwell, so that the driver's footwell or the front passenger's footwell can be ventilated.

In an advantageous design, provision is made for the air inlet opening and the air outlet opening to be arranged situated next to one another in the subspaces in such a manner that the air-conveying unit forms a closed circulating-air flow in the form of a cylinder or a roller. Provision is made, in particular, for each of the air inlet opening and the air outlet opening to have a rectangular base surface with a short transfer extent and a long longitudinal extent. The length of the longitudinal extent preferably determines the width of the roller-shaped flow. Provision can be made, in particular, for the air inlet opening and the air outlet opening to have essentially the same longitudinal extent or, since the air flow widens in its profile, provision is made for the air outlet opening to have a greater transverse extent than the air inlet opening.

In one design, provision is made for the heating and/or air conditioning system to have a plurality of switchable operating modes, such as, for example, heating operation and/or cooling operation and/or outside-air operation and/or circulating-air operation and/or defrosting operation. The central air-conveying and/or air-conditioning device conveys outside air in at least one operating mode and feeds it into the vehicle interior as ingoing air or outside air which is conditioned in a manner which can be set in advance in accordance with the desired interior climate. This means, for example, that in winter cold outside air has to be greatly heated up or in the summer hot outside air has to be greatly cooled, for which purpose a correspondingly high expenditure of energy is required in each case.

In order to provide a pleasant interior climate in the vehicle with little expenditure of energy, already preconditioned interior air is therefore advantageously used for air conditioning purposes; this is referred to as circulating-air operation. However, this circulating air has the disadvantage that it becomes, as a rule, quite moist very rapidly, in particular when vehicles are fully occupied. This interior air can therefore only be used in the region of the footwell, since otherwise an impairment in the comfort of the occupants occurs or, given an appropriate outside temperature, the windows could become misted from the inside.

The central air-conveying and/or air-conditioning device conveys the outside air into the upper region of the interior or removes it therefrom. The decentralized air-conveying device circulates the circulating air in the lower region of the interior, so that a layering of the air is formed. The conditioned, in particular dry outside air is arranged in the upper region of the interior and the circulating air is arranged in the lower region of the interior. Mixing of ingoing air and circulating air, which is undesirable because it causes misting of the windows, is therefore largely avoided in the vehicle interior.

In order to condition the circulating air, an air-conveying unit or a plurality of air-conveying units of the decentralized air-conveying device can have a heating and/or cooling device, preferably with Peltier elements. Provision is made for the heating and/or cooling device to be individually controllable, so that the temperature and/or air humidity and/or air speed can be set individually in one or more subspaces.

In one advantageous design, an air-conveying unit or a plurality of air-conveying units of the decentralized air-conveying device can be designed as a "disc fan". The disc fan has a rotating assembly comprising a plurality of parallel discs of small thickness, in which two discs in each case bound an air gap lying in between. The disc fan can be designed, in particular, in such a manner that the intake direction and blow-off direction lie in one plane. By means of this construction, the disc fan promotes, in particular, the design of stable and inherently closed flow rollers. It is likewise of advantage that the disc fan has, owing to its type of construction, only a very low noise level, so that complicated sound-damping measures which are afflicted by flow losses can be reduced or can be entirely omitted. The low level of noise constitutes an advantage in terms of comfort for the arrangement of the disc fan in the interior.

In one design, the disc fan can be designed as a heating and/or cooling device. Individual discs of the disc fan can be designed to be electrically conductive or can have an electrically conductive coating, so that the discs can be heated electrically. Provision is similarly made for individual discs of the disc fan to have one or more Peltier elements or to be designed as such, and therefore to be electrically heatable and/or coolable.

Further features and embodiments of the invention will be apparent from the claims, the figures and the description of the figures. The features and combinations of features which are mentioned above and are described below can be used not only in the respectively stated combination, but also in other combinations or on their own without departing from the scope of the invention.

Further designs of the invention are illustrated and explained in the figures.

DETAILED DESCRIPTION OF THE INVENTION

Figure 1:
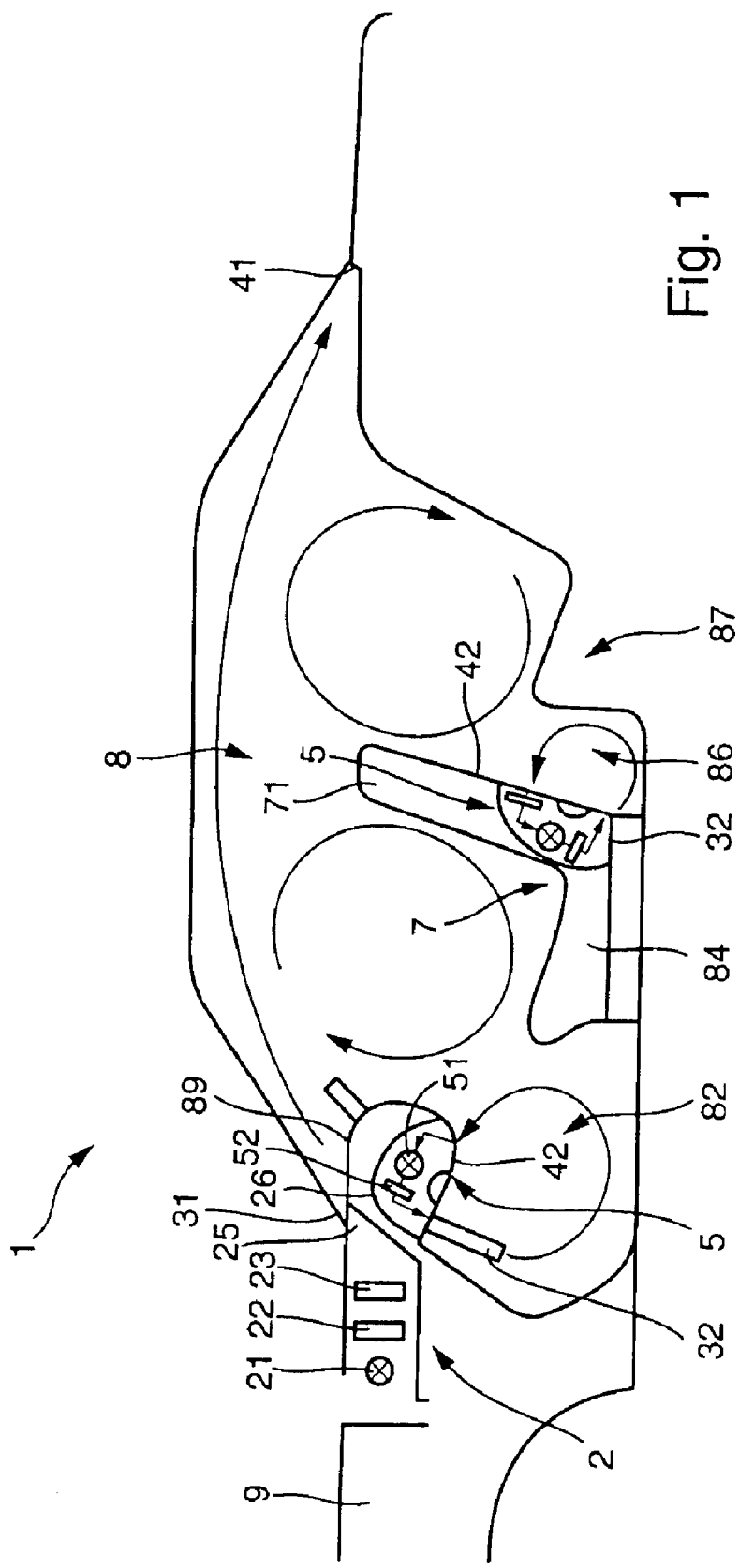
FIG. 1 is a side view of the heating and/or air conditioning system having a decentralized air-conveying device in a vehicle.

FIG. 1 shows an arrangement of the heating and/or air conditioning system 1 in a passenger vehicle, in a schematic side view. The heating and/or air conditioning system 1 comprises a central air-conditioning and/or air-conveying device 2. In the following, centrally means arranged at a central point, and, as in FIG. 1, arranged in the engine compartment 9. Furthermore, the heating and/or air conditioning system 1 has a plurality of local air-conveying units 51 of a decentralized air-conveying device 5, which units are distributed in the vehicle interior 8. Decentralized here means distributed at a plurality of locations in the vehicle interior 8.

In the front region of the vehicle interior 8, a dashboard 89 is arranged downwardly adjoining a windscreen. The driver's and front passenger's footwell 82 is situated below the dashboard. The vehicle interior 8 has a largely flat interior floor which is divided in the longitudinal direction of the vehicle by a central tunnel. The central tunnel partitions off the driver's footwell 82 from the front passenger's footwell in the longitudinal direction of the vehicle, so that the driver's footwell 82 and the front passenger's footwell each form a subspace.

A driver's seat 7 and a front passenger's seat are fastened on the interior floor in a manner such that they can be displaced in the longitudinal direction of the vehicle. The rear side of the vehicle interior 8 is closed by a rear seat bench 87. A rear window shelf, which covers the remaining space to the rear window and can be used as a storage space, is fitted at the upper end of the rear seat bench 87.

The vehicle interior 8 has a relatively large amount of cavities and has a plurality of subspaces, such as, for example, driver's footwell 82, front passenger's footwell, rear footwell 86, which are delimited by boundaries (shown below). The front seats 7, i.e. the driver's seat and the front passenger's seat, divide the vehicle interior into a front section in front of the driver's seat 7 or front passenger's seat and a rear part between the rear seat bench 87 and driver's seat 7 or front passenger's seat. In addition, the vehicle interior 8 is divided in the lower region in the longitudinal direction by the central tunnel. In the upper region of the vehicle interior there is, in the head or chest region of the passengers, a free interior section which is arranged between the upper end of the seats 7 or the headrests thereof and the roof lining and extends from the dashboard 89, which is arranged at the front, to the rear as far as the upper end of the rear seat bench 87.

Respective air-conveying units 51 of the decentralized air-conveying device 5 are arranged in the individual subspaces of the vehicle interior 8.

The central air-conveying and/or air-conditioning device 2 has a central air-conveying unit 21, a heat exchanger 22 and an evaporator 23. The central air-conveying unit 21 conveys outside air through the evaporator 23 and the heat exchanger 22 and through air ducts 25 into the vehicle interior 8. The outside air flows from the outside into the air conditioning housing 2 and is guided via a water box which separates off any water which may have been carried along by the air. In addition, adjustable flaps and bypass ducts are arranged in the air conditioning housing 2 in order, depending on the desired operating mode and/or temperature and/or humidity, to conduct the outside air through the heat exchanger 22 and/or the evaporator 23 or only to conduct some of the outside air through them or around them. The outside air can thus be conditioned as desired in accordance with the desired interior climate.

The air which has been conditioned by the central air-conveying and/or air-conditioning device enters into the vehicle interior 8 via an inlet opening 31 arranged on the windscreen in the region of the dashboard 89. This inlet opening 31 extends over a large part of the width of the dashboard 89 or of the vehicle at the lower end of the windscreen. The inlet opening 31 is assigned an outlet opening 41 arranged in the region of the rear window. The outlet opening is arranged in the region of the rear window shelf in the lower region of the rear window and likewise extends over a large part of the vehicle width. This arrangement of the inlet opening 31 and outlet opening 41 has the effect that the air conditioned by the central air-conveying and/or air-conditioning device 2 is guided, as illustrated in FIG. 1 by an arrow, along the existing boundary surfaces of the interior, such as the windscreen, roof lining and rear window, to the outlet opening 41. This conditioned air therefore flows around the windows and the head regions of the passengers. In the case of the circulating-air operating mode, it is made possible for a proportion of outside air to be guided in the upper region of the vehicle interior 8 and/or in the region of the windows via the central air-conveying and/or air-conditioning device 2.

In the vehicle interior 8, local air-conveying units 51 of the decentralized air-conveying device 5 are arranged in the delimited subspaces, such as, for example, the driver's footwell 82 and/or front passenger's footwell and/or rear footwell 86, so that a targeted ventilation of these locally delimited subspaces is made possible.

In the same manner as in the region of the front passenger's footwell, an air-conveying unit 51 is arranged in the region of the driver's footwell, in the region of the lower side of the dashboard 89.

Like the front passenger's seat, the driver's seat 7 has an air-conveying unit 51. The air-conveying unit 51 is accommodated within the backrest 71, the inlet opening and the outlet opening being directed towards the rear footwell, which is arranged behind the seat, with the result that the rear footwell is ventilated.

The seats 7 having the integrated air-conveying units 51 can also advantageously be used in buses or passenger trains, in particular for the individually settable air conditioning of individual, locally delimited regions, such as, for example, a seat.

The decentralized air-conveying device 5 circulates circulating air in the lower region of the vehicle interior 8. The circulating air is conducted from the inlet opening 3 along one or more boundary surfaces and then flows towards the outlet opening 4. The circulating air is taken in again there by the air-conveying unit 51 and blown again through the inlet opening 3 into the corresponding subregion of the vehicle interior. The local air-conveying units 51 thus in each case form a circulating-air circuit having a roller-shaped or cylindrical flow path, as illustrated in FIG. 1 by arrows.

The local units 5 form stable, roller-shaped flow paths in the vehicle interior. This ensures that for the most part the air which is fed into the vehicle interior 8 from an inlet opening 3 is for the most part removed again from the vehicle interior 8 through the associated outlet opening 4.

The inlet opening 3 and the outlet opening 4 of the local air-conveying units 51 each have a rectangular base surface with a narrow transverse extent and long longitudinal extent. The longitudinal extent runs transversely to the longitudinal direction of the vehicle and is matched to the width of the flow roller.

As illustrated in FIG. 1, roller-shaped circulating-air flows are formed in the region of the footwells 82, 86. The conditioned outside air is guided in the head space. These flows, which are caused by active ventilation, bring about further, corresponding air flows which likewise have a roller-type shape and are arranged in front of the seat surface or seat back surface of the driver's seat 7 or front passenger's seat. Contact surfaces are formed on the surfaces at which the individual flows come into contact in the roof region or footwell region. A slight mixing of the different air flows is possible in each case at these contact points.

A layered air flow is formed in the vehicle interior 8 by means of the arrangement of the local air-conveying units 51 of the decentralized air-conveying device 5. Conditioned outside air or fresh air is guided in the upper region of the vehicle interior 8. Circulating air together with a portion of outside air is guided in the central region of the vehicle interior 8, as a consequence of the slight mixing of the various air flows which come into contact. Circulating air is predominantly guided in the lower region of the vehicle interior 8.

Figure 2A:
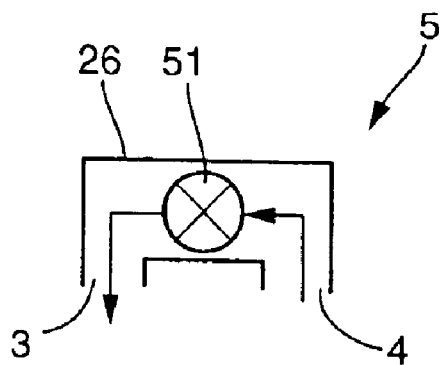
FIGS. 2a–c are schematic illustrations of air-conveying units of the decentralized air-conveying device.
Figure 2B:
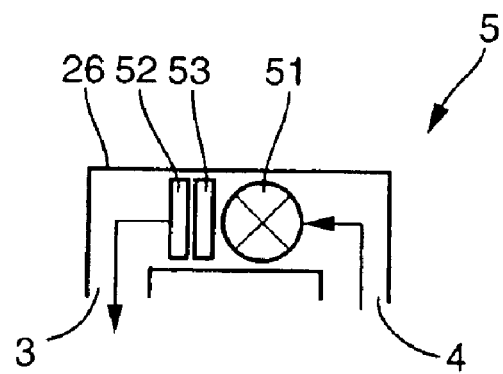
Figure 2C:
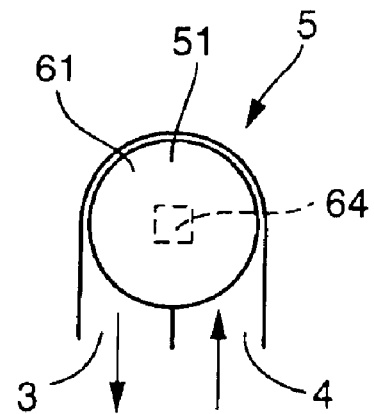

The schematic construction of the air-conveying units 51 of the decentralized air-conveying device 5 is illustrated in FIGS. 2*a* to *c*. The air-conveying units 51 form units which are closed in each case and have an inherently closed air duct 26 with an inlet opening 3 and an outlet opening 4. The air-conveying unit 51 is arranged within the air duct 26, as illustrated in FIG. 2a. The air-conveying unit 51 can be designed as an electrically driven axial fan or radial fan.

FIG. 2b shows a unit which additionally also has a heating element 52, which is arranged in the air duct, for heating the air and a cooling element 53 for cooling the air. The heating element 52 is arranged, as is also the cooling element 53, downstream of the air-conveying unit 51 within the air duct 26. In a form which is modified with respect to the design illustrated, the heating element 52 and/or the cooling element 53 can also be arranged upstream. The heating element 52 can have electrically heatable resistors, in particular PTC resistors. The cooling element 53 can have electrically operated Peltier elements for heating and/or cooling the air.

Provision is made for the local air-conveying unit 51 and/or the local heating element 52 and/or the local cooling element 53 to be individually settable. Owing to the preselectable cooling process, the air can also be individually dehumidified. A passenger can thus individually set the temperature and/or the strength of the circulation of the circulating air in a subspace. Provision is furthermore made to control the air-conveying unit 51 and/or the local heating element 52 and/or the local cooling element 53 jointly with the central air-conveying unit 21 and/or the central heat exchanger 22 and/or the central evaporator 23 and/or further local units via a control device, in order to make possible a pre-set air conditioning program, for example a rapid heating up or cooling down of the vehicle interior 8.

FIG. 2c shows a particularly compact design, in which the air-conveying unit 51 is designed as a disc fan. In this case, the air duct 26 forms the housing of the disc fan. The inlet opening 3 and outlet opening 4 are arranged lying next to one another in a plane, so that a deflection of the air, as is necessary in the examples of FIGS. 2a and 2b, is rendered superfluous. The design of the air-conveying unit 51 as a disc fan thus enables the local units to be designed in a structurally simple and compact manner.

Figure 3:
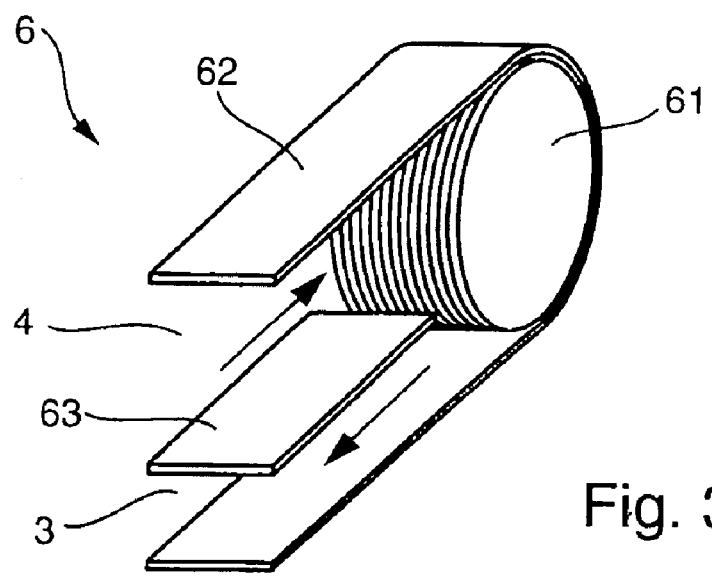
FIG. 3 is a schematic view of the construction of a disc fan with an illustration of conveying directions.
Figure 4:
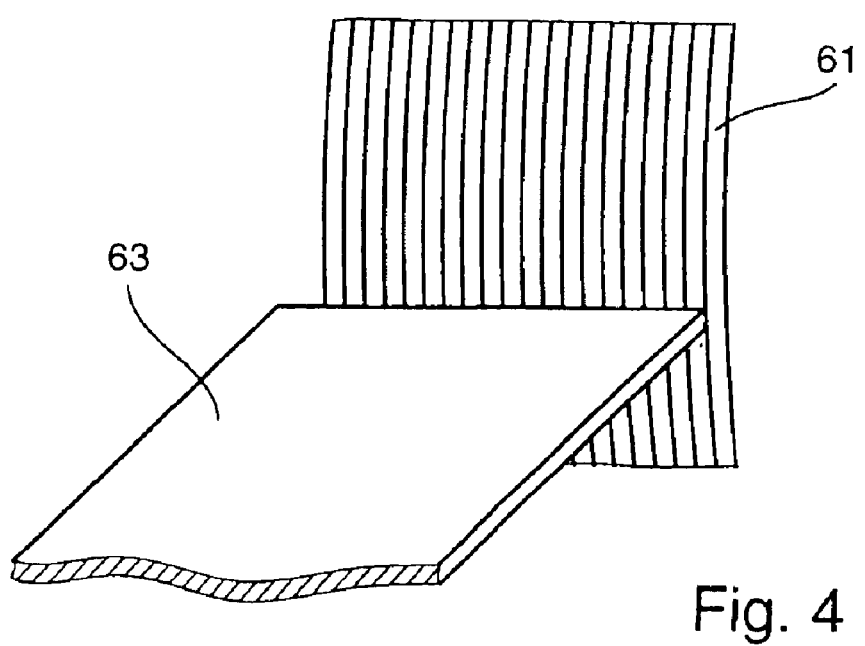
FIG. 4 is an enlarged detail of the intake region of the disc fan.

The construction of the disc fan is shown in FIG. 3. It has a disc-fan housing 62 in which a rotor is rotatably mounted. The latter has an assembly comprising a plurality of thin discs 61 which are arranged parallel to and at a distance from one another in a rotationally fixed manner on a common shaft. An air gap is formed in each case between two discs 61. The rotor of the disc fan 6 can have approximately 10 to 100 discs depending in each case on the desired amount to be conveyed. It has been shown that a disc thickness of 0.2 mm to 1 mm and a disc spacing of 2 mm to 8 mm at a disc diameter of 5 cm to 30 cm are ideal. The rotor is caused to rotate by a motor 64 by the motor 64 driving the shaft. The disc-fan housing 62 has an inlet opening 3 and an outlet opening 4. The inlet opening 3 and the outlet opening 4 are situated in one plane, the air which is sucked in and the air which is conveyed having opposite directions of flow (FIG. 4). The air-conveying openings 3, 4 are arranged lying next to one another on one side of the housing 62 and are separated by a partition 63.

The disc fan 6 is designed in such a manner that it deflects the conveyed air. Since the air entry direction and the associated air discharging direction are situated in a common plane, complicated measures for deflecting air, which measures have a high flow loss, can be reduced or completely omitted when the disc fan 6 is used. Owing to its structural design, the disc fan 6 assists the formation of stable, roller-shaped flow patterns, so that the use of a disc fan 6 assists the intended, stable guidance of circulating air along closed flows.

The discs 61 of the disc fan 6 can be designed such that they can be electrically heated by having, for example, an electrically conductive coating or being formed from an electrically conductive material.

Furthermore, the discs 61 of the disc fan 6 can have one or more Peltier elements for heating and/or cooling the circulating air, so that the rotor of the disc fan 6 is designed as a heating element 52 and/or cooling element 53 for heating and/or cooling the circulating air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A heating and/or air conditioning system for a plurality of subspaces in an interior of a vehicle, including at least one of a driver's footwell, a front passenger's footwell, and a rear footwell, comprising:

a central air-conveying and/or air-conditioning device which is designed for at least one of heating, cooling, drying, cleaning, humidifying, and conveying air, having at least one central air-conveying unit, a heat exchanger and an evaporator, and which can be switched between a plurality of operating modes, and a plurality af decentralized air-conveying devices, each of which has a local air-conveying unit, arranged in the vehicle interior, wherein respective local air-conveying units of the decentralized air-conveying devices are arranged in a plurality of the subspaces in the vehicle interior, wherein, in at least one operating mode, the central air-conveying and/or air-conditioning device feeds ingoing air into the vehicle interior and removes outgoing air, and the local air-conveying units of the decentralized air-conveying devices circulate air in respective subspaces, and wherein at least one of the local air-conveying units arranged in at least one of the subspaces circulates the air in the at least one of the subspaces in such a manner that a respectively closed air flow in the form of a roller is produced in the at least one of the subspaces.

2. The heating and/or air conditioning system according to claim 1, wherein at least one of the local air-conveying units of the decentralized air-conveying devices has an air inlet opening and an air outlet opening, and wherein the air inlet opening, the air outlet opening, and the at least one of the local air-conveying units are arranged in the same subspace of the vehicle interior.

3. The heating and/or air conditioning system according to claim 2, wherein the local air-conveying unit is connected to the air inlet opening and the air outlet opening via a closed air duct.

4. The heating and/or air conditioning system according to claim 2, wherein the at least one of the local air-conveying units is installed in a lower region of a seat in such a manner that the air inlet opening and the air outlet opening face a footwell which is situated behind the seat, and wherein the at least one of the local air-conveying units circulates the air in this footwell via the air inlet opening and the air outlet opening.

5. The heating and/or air conditioning system according to claim 2, wherein the at least one of the local air-conveying units is arranged in a region of the driver's footwell or the front passenger's footwell in such a manner that the air inlet opening and the air outlet opening face the driver's footwell or the front passenger's footwell, respectively, and wherein the at least one of the local air-conveying units circulates air in this footwell via the air inlet opening and the air outlet opening.

6. The heating and/or air conditioning system according to claim 1, wherein at least one of said local air-conveying units can be controlled individually, regulated individually, or controlled and regulated individually.

7. The heating and/or air conditioning system according to claim 1, wherein the central air-conveying and/or conditioning device is designed so that outside air is supplied and removed again in an upper region of the vehicle interior by feeding the ingoing air into the vehicle interior on one side of the vehicle in the region of the windows and removing air from the upper region of the vehicle interior on the opposite side of the vehicle in the region of the windows.

8. The heating and/or air conditioning system according to claim 1, wherein each of the decentralized air-conveying devices is designed in such a manner that it circulates the circulating air in the lower region of the vehicle interior.

9. The heating and/or air conditioning system according to claim 7, wherein the central air-conveying and/or air-conditioning device and the decentralized air-conveying devices are designed so that the air in the vehicle interior is layered, and wherein ingoing air is guided in the upper region and circulating air is guided in a lower region of the vehicle interior along flow paths which are closed per se with as little mixing between the ingoing air and the circulating air as possible occurring in the vehicle interior.

10. The heating and/or air conditioning system according to claim 1, wherein at least one of the local air-conveying units of the decentralized air-conveying devices has a heating and/or cooling device which can be controlled individually.

11. The heating and/or air conditioning system according to claim 1, wherein at least one of the local air-conveying units of the decentralized air-conveying devices is designed as a disc fan.

12. The heating and/or air conditioning system according to claim 11, wherein the disc fan is designed as a heating and/or cooling device by individual discs of the disc fan being electrically heatable and/or coolable.

13. The heating and/or air conditioning system according to claim 12, wherein the disc fan is designed as a heating and/or cooling device by having at least one of an annular heat exchanger and an annular evaporator engaging between the discs.

14. The heating and/or air conditioning system according to claim 4, wherein said lower region of the seat is in a backrest or a seat cushion.

15. The heating and/or air conditioning system according to claim 4, wherein said footwell is a rear footwell.

16. The heating and/or air conditioning system according to claim 10, wherein the heating and/or cooling device is at least one of a heating element, a cooling element, and a Peltier element.

17. The heating and/or air conditioning system according to claim 1, wherein the ingoing air is fed through an inlet opening at a lower end of a vehicle windscreen, into the vehicle interior so that the air is a guided along boundary surfaces of the interior of the vehicle, and to an outlet opening arranged in a region of a vehicle rear window so that the outgoing air is removed through said outlet opening.

* * * * *